United States Patent Office 3,436,312
Patented Apr. 1, 1969

3,436,312
CARBONIZATION OF BAGASSE
Manuel F. Leonor, New York, N.Y., assignor to
Emilia Robertson, New York, N.Y.
No Drawing. Filed Aug. 29, 1962, Ser. No. 220,153
Int. Cl. C10l 9/02; C10b 57/04
U.S. Cl. 201—25                                    4 Claims This invention relates to the carbonization of bagasse to provide the carbon values in the bagasse in a form suitable for use, for example, as a heating medium.

Bagasse is the wood stem of the sugar cane. It is a by-product of the sugar industry present in large amounts at low costs in areas where sugar is produced. The abundance of this byproduct material has attracted the attention of many, and through the years proposals for utilization of the material have been frequented. A use commonly suggested is to carbonize the bagasse to provide it in a form suitable for use as fuel, and various of these proposals have been tried.

A problem incidental to such use of bagasse is with respect to bulk density of the carbonized product. Thus, absent special precautions carbonized bagasse has a very low bulk density so that storage and transportation are complicated. Further, the low bulk density gives rise to various difficulties in the utilization of the material as fuel. One suggestion to obviate the bulk density problem, in the prior art, is to briquette the bagasse before subjecting it to carbonization. While this does provide a solution to the problem, yet the cost of briquetting is substantial.

A principal object of the invention is to provide a process for carbonizing of bagasse characterized in that the carbonized product is of acceptable bulk density, and further characterized in the fact that the inconvenience of briquetting is avoided.

A further object of the invention is to provide a process for carbonizing of bagasse characterized in that the carbonized product can be in the form of relatively small particles—relative to the common sizes for briquettes—so that the carbonized product is in better form for utilization as fuel, while at the same time the carbonized product has a suitable high bulk density.

According to the invention, bagasse is carbonized in a process which comprises the step of contacting the bagasse with sulfuric acid to reduce its weight by more than about 20 percent, followed by the further step of separating the bagasse residue from said contacting medium, and thereafter carbonizing the separated residue.

The starting material for the process can be green bagasse such as results from the expressing of juice from the cane. The green bagasse need not be dried. It contains, usually, about 30–40 percent water. Preferably, it is shredded to a small particle size before the treatment with acid. It can be shredded to a particle size of about ½ to 1 inch in length, and upon such treatment, elongated particles of said length will be obtained.

The contacting with acid can be carried out in a rotary digesting apparatus. The contacting is a digestion operation wherein a hydrolysis occurs. In this contacting, the bagasse is partially carbonized, and a darkening thereof occurs. While it is not desired to predicate this invention on any particular theory, it is believed that the acid treatment breaks down some of the $C_6H_{10}O_5$ units to leave as residue carbon.

In general, as the amount of acid is increased, the extent of hydrolysis is increased, and as the amount of steam is increased, the extent of hydrolysis is increased. The steam essentially catalyzes the hydrolysis. The temperature for the hydrolysis step can be any suitable temperature, for example, a temperature below the bubble point for the liquor at the pressure employed for the digestor, and advantageously, atmospheric pressure is employed, and the temperature is then less than about 100° C. For atmospheric operation, the temperature is preferably at least 50° C. If desired, pressures in excess of atmospheric and corresponding higher temperatures can be used. The digestor can be heated during the digestion.

Following removal of material from the digestor, the solids can be separated from the liquor by filtering, and the solids can be subjected to mild heating to dispel free moisture therefrom. Drying, however, is not necessary, and if desired, the wet solids can be subjected to the carbonization later described.

The treatment with acid results in a substantial weight reduction, and an increase in bulk density of the bagasse. The weight reduction can be about 30–40 percent. That is, the weight of the digested bagasse dried to a given moisture content can be about 30–40 percent of the weight of the green bagasse dried to the same moisture content.

The bulk density of the digested bagasse can be about 30–50 percent higher than the bulk density of the green bagasse, again, the comparison being on the basis of the materials dried to the same moisture content. This weight reduction and increase in bulk density is of considerable significance since green bagasse can be subjected to the digestion and then shipped to suitable points for further treatment, for example, carbonization. The weight modification makes such shipment feasible.

The carbonization is preferably a low temperature carbonization. It can be at a temperature of about 450–700° F. The carbonization can be carried out by known means, and is preferably carried out in a rotary kiln. The carbonization product can be about 50 percent by weight of the green bagasse starting material. The treatment of the invention including the digestion and carbonization can result in an increase of kiln capacity of about 25 percent over the kiln capacity obtainable when briquettes are carbonized. This figure is based on green bagasse starting material.

The process of the invention can be operated on a continuous or batch basis.

With respect to particular amounts of materials, per one hundred parts of bagasse, the sulfuric acid can be 15–50 parts of one hundred percent sulfuric acid, preferably 15–30 parts, and the water can be about 2–20 parts, preferably 4–8 parts. The steam injection can be about 1 part per hour per 100 parts of bagasse.

The invention is further described in the following example:

100 pounds of green bagasse shredded to particles ranging in length up to ¾ inch is admixed in a digestor with 25 pounds of 100% $H_2SO_4$ and 6 parts $H_2O$. The admixture is agitated, heated to 150° F., and steam at atmospheric pressure is then injected at the rate of 5 pounds per hour. Contacting at these conditions is continued for twenty minutes. The digestion is then complete, and the digested bagasse and liquor are removed from the digestor and separated by filtering. The bagasse can then be washed with water, and the wet bagasse, which is partially carbonized, can be subected to a low temperature carbonization in a kiln as is above described.

While the invention has been described with reference to particular embodiments thereof, various modifications and variations will occur to those skilled in the art, and it is desired to secure by these Letters Patent all such variations as are within the scope of the appended claims.

What is claimed is:
1. The process of converting without briquetting a green bagasse having a residual sugar content into a carbonized bagasse of high bulk density, comprising the steps of:

(a) treating the green bagasse with an acid in a concentration bringing about hydrolysis and partial carbonization of the bagasse to an extent sufficient to increase its bulk density to about 30% to 50% higher than the bulk density of green bagasse based on drying both to the same moisture content, (b) separating the bagasse residue from the liquor produced by the acid treatment, and (c) heating the separated bagasse residue in the substantial absence of oxygen to produce a fully carbonzide bagasse of high bulk density.

2. A method as set forth in claim 1, further including the step of first shredding the green bagasse before acid treatment to produce particles whose sizes range from ½ to 1 inch in length.

3. The method as set forth in claim 1, wherein said acid treatment is with sulphuric acid in a concentration of 15 to 50 parts of acid for 100 parts by weight of green bagasse.

4. The method as set forth in claim 3, wherein 2 to 20 parts by weight of water are employed per 100 parts by weight of bagasse.

References Cited

UNITED STATES PATENTS

| | | | |
|---|---|---|---|
| 300,384 | 6/1884 | Mathieu | 202—26 XR |
| 401,607 | 4/1889 | Thompson | 202—25 |
| 726,029 | 4/1903 | Classen | 44—26 XR |
| 1,032,391 | 7/1912 | Ewen et al. | 44—26 |
| 1,369,428 | 2/1921 | Hawley | 202—26 |
| 1,379,222 | 5/1921 | Seaman | 202—25 |
| 1,482,939 | 2/1924 | Mc Intosh | 202—25 |
| 1,538,505 | 5/1925 | Atkinson | 202—25 |
| 1,913,122 | 6/1933 | Kern | 204—34 XR |

OTHER REFERENCES

Coal Coke and Coal, Wilson and Wells (Chemical Engineering Series) Published by McGraw-Hill Book Company, Inc., New York 1950.

DANIEL E. WYMAN, *Primary Examiner.*

CARL F. BEES, *Assistant Examiner.*

U.S. Cl. X.R.

44—1